(No Model.)
P. G. GESFORD, Jr.
DEVICE FOR ADJUSTING AND REMOVING NUTS.
No. 317,637. Patented May 12, 1885.
Fig. 1.
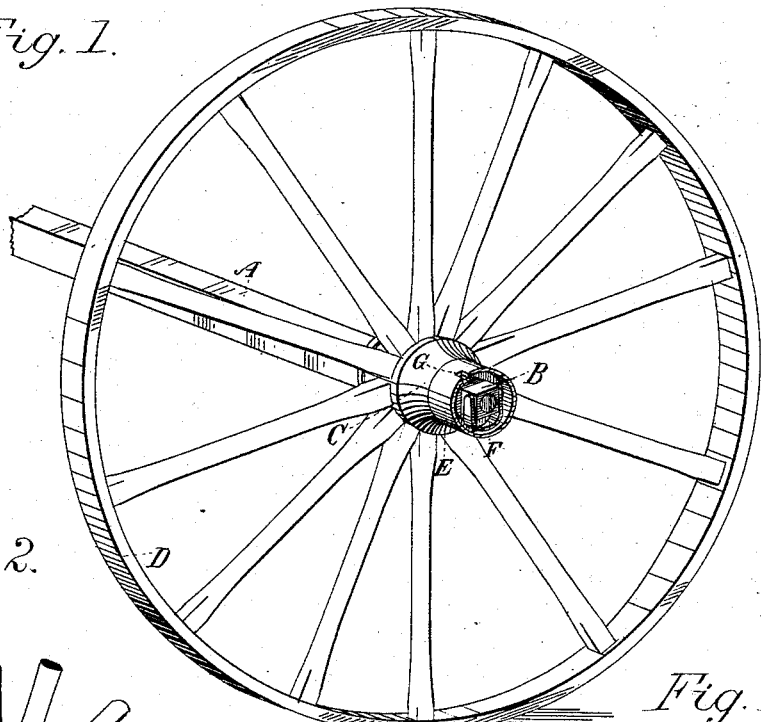
Fig. 2.
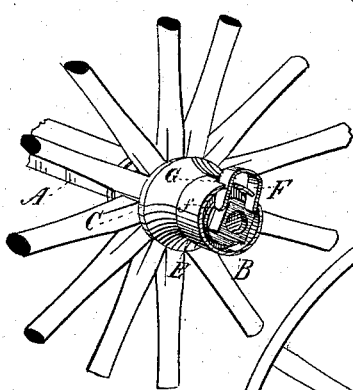
Fig. 3.
Fig. 4.
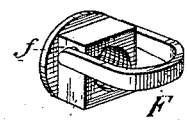
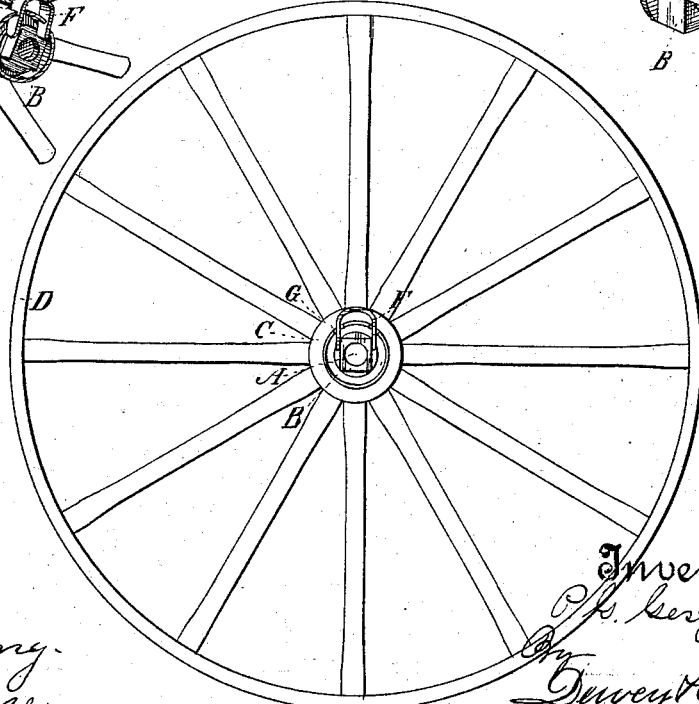
Witnesses,
Geo. H. Strong.
J. H. Rouse.
Inventor,
P. G. Gesford jr
By
Dewey & Co.
attorneys

UNITED STATES PATENT OFFICE.

PRESTON G. GESFORD, JR., OF NAPA, CALIFORNIA.

DEVICE FOR ADJUSTING AND REMOVING NUTS.

SPECIFICATION forming part of Letters Patent No. 317,637, dated May 12, 1885.

Application filed September 1, 1884. (No model.)

*To all whom it may concern:*

Be it known that I, PRESTON G. GESFORD, Jr., of Napa, county of Napa, and State of California, have invented an Improvement in Devices for Adjusting and Removing Nuts; and I hereby declare the following to be a full, clear, and exact description thereof.

My invention relates to a new and useful device for setting up and removing nuts, especially those upon the ends of axles of vehicles, and which hold the wheels in place; and my invention consists in a means for readily establishing a temporary connection between the nut and the hub of the wheel, whereby, upon the movement of the wheel, the nut will be rotated to set it up or remove it.

My invention further consists in the swinging loop or link pivoted to the nut and adapted to engage with the hub in the manner I shall hereinafter particularly describe.

The object of my invention is to provide a means for readily adjusting and removing such nuts without the use of the ordinary monkey-wrench, the carrying of which about the vehicle is thus obviated.

Referring to the accompanying drawings for a more complete explanation of my invention, Figure 1 is a perspective view of a wheel, showing the loop F dropped out of the way. Fig. 2 is a perspective view showing the loop in engagement with the hub. Fig. 3 is an elevation of same. Fig. 4 is a perspective view of nut B and loop F.

A is the axle of a vehicle, having a threaded outer end, as usual, to receive a nut, B.

C is the hub of the wheel D, mounted upon the journal of the axle A. This hub has on its outer end the usual metal band, E.

It is obvious, if a connection between the nut and the hub of the wheel be established, that upon the rotation of the wheel the nut will be rotated also, and, according to the direction of the revolution, will be set up or removed. This connection, which, of course, should be a temporary one, and only for the purpose described, might be made in several ways; but the manner which I prefer and which I deem the simplest is the following:

A loop or link, F, is made so that its ends bend inwardly at right angles and fit into sockets *f*, made to receive them, in the side of the nut. In the edge of the hub-band are made two notches, G, with which the loop F is adapted to engage, thereby completing the connection between the hub and the nut. When not in use, the loop F is turned away from its engagement and swung to the other side of the nut, where it rests out of the way, partially within the socket formed by the overlapping rim of the hub-band, as shown in Fig. 1. This convenient disposal of the loop is effected by reason of pivoting it to one side of the transverse central line of the nut, whereby it is enabled to reach on one side the notches in the hub-band, and when folded the other way to fall short of it and lie within it, where it does not interfere with the hub.

In operating the device the usual lifting-jack is used under the axle to raise the wheel from the ground, as in the case of the ordinary removal of the wheel. The loop F is then swung into engagement with the notches in the hub-band, and the wheel is rotated in such a direction as to unscrew the nut. The operation of setting up or adjusting is the reverse of that just described.

Having thus described my invention, what I claim as new, and desire to secure by Letters Patent, is—

1. A device for adjusting or setting up and removing nuts on the axle of a vehicle, consisting of a U-shaped swinging loop or link, F, pivoted to the nut D, which is provided with sockets *f*, and adapted to engage temporarily with the hub of the vehicle, whereby a connection is formed between said nut and hub, substantially as and for the purpose herein described.

2. The axle A and wheel D of a vehicle, having a hub, C, with a band, E, provided with notches G, in combination with the nut B on the end of the axle, said nut having sockets *f*, and swinging loop or link F, pivoted to the nut at one side of its transverse central line, and adapted to be moved into engagement with the notches of the hub-band, substantially as and for the purpose herein described.

PRESTON G. GESFORD, JR.

Witnesses:
HENRY C. GESFORD,
HENRY HOGAN.